Figure 1:
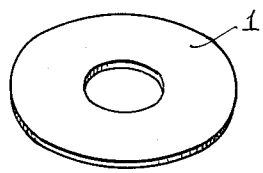

March 28, 1939.  C. E. SWARTZ  2,152,611
METHOD OF MAKING COMPOSITE METALLIC ELEMENTS
Filed July 22, 1936

INVENTOR.
Carl E. Swartz
BY Fay, Oberlin & Fay
ATTORNEYS.

Patented Mar. 28, 1939

2,152,611

UNITED STATES PATENT OFFICE 2,152,611

METHOD OF MAKING COMPOSITE METALLIC ELEMENTS

Carl E. Swartz, Cleveland Heights, Ohio, assignor to The Cleveland Graphite Bronze Company, Cleveland, Ohio, a corporation of Ohio Application July 22, 1936, Serial No. 91,869

2 Claims. (Cl. 75—22)

The present invention relates to a novel method for making a composite metallic element consisting of one portion or layer of a solid metal supporting element, and another portion or layer, integrally bonded thereto, of a sintered metallic powdered material. The principal object of the invention is to provide an efficient, economical and improved process for producing such a composite metallic element which will possess high strength and durability, uniform density and grain structure of the sintered material and controlled frictional properties; and wherein a strong and adequate bond will be provided between the composite layers.

It is old in the art to produce a composite material by mixing together finely divided copper, lead, tin, graphite and, in some instances, inert material, apply a heavy pressure to a selected portion of such a mixture and at the same time subject the mixture to heat sufficient to sinter the materials into a solid integral mass. Such composite articles as made in the past, however, have been somewhat brittle and have been difficult to bond or unite to a supporting member to supply the strength which is lacking in the composite article itself. Where such articles have been united to supporting members, such as steel plates or the like, the operation has been lengthy and expensive, involving successive, intermittent steps of operation, and has not always given uniform or satisfactory results.

In the method embodying the principle of my invention, however, the disadvantages, prohibitive costs, and satisfactory results heretofore inherent in prior art practices are obviated. In the present method the loose, unpressed metallic powder mixture is transformed directly into a sintered material bonded to the solid metal body of the supporting layer in a single operation. That is to say, the steps of forming, sintering and bonding of the metallic powdered mixture to the solid metal supporting element are accomplished in my method in a single operation, and not in successive step by step operations heretofore taught by the art.

My novel method possesses the advantages in that (1) it is capable of more rapid operation and hence adaptable to quantity and practical commercial production, (2) the operating pressures are greatly reduced, (3) better uniformity and density of the sintered material is obtained, (4) improved grain structure of the sintered material results due to the aiding and encouraging of grain growth between the metallic particles during the simultaneous application of pressure and heat, and (5) the elimination of excessive oxidation resulting in improved physical properties of the sintered metallic material and a strong and satisfactory bond between the composite layers.

To the accomplishment of the foregoing and related ends, my invention, then, consists of the steps hereinafter fully described and particularly pointed out in the claims; the following description setting forth in detail certain steps embodying the invention, such disclosed steps constituting, however, but one of the various ways in which the principle of the invention may be used.

Figure 2:
Figure 3:
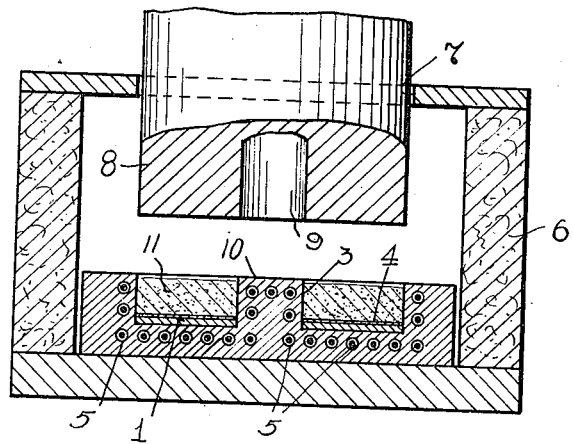
Figure 4:
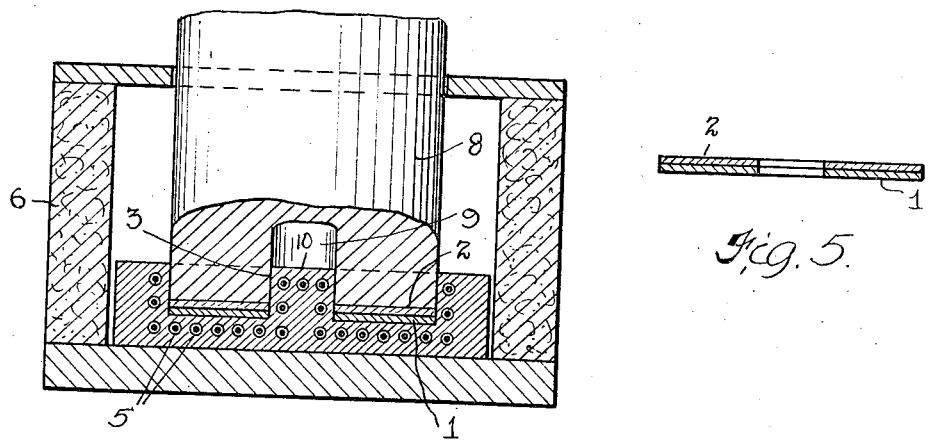
Figure 5:
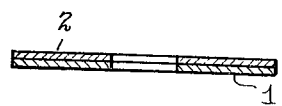

In the annexed drawing:

Fig. 1 is a perspective view of a ring of the solid supporting metal element, such as steel; Fig. 2 is a sectional view of the ring of Fig. 1 showing a layer of protective material applied thereto precedent to its use in the performance of my process; Figs. 3 and 4 are sectional views illustrating an apparatus applicable to perform the process embodying the principle of my invention, the parts thereof being shown in different positions of operation; and Fig. 5 is a sectional view of the finished product.

The herein described and claimed method is particularly adaptable to produce composite metallic articles suitable for use as elements of clutches, brakes, bearings, and the like. The particular article here described by way of exemplary illustration of the practice of my method is a clutch facing element in the form of a flat ring and consisting of the reinforcing and supporting layer 1 of solid metal such as steel and the layer 2 of sintered metallic powder material.

In the practice of my process, the supporting layer or element 1 is placed in a die cavity 3. The steel ring 1 has a mechanically and chemically cleaned surface produced by abrading, polishing, machining, sand blasting, or pickling, which cleaned surface is protected against subsequent oxidation or contamination by a non-reactive coating 4 either consisting of a high flash point oil or of a thin flash coating of copper plate. Heating means is provided in the wall surrounding the die cavity 3 and may consist of electric conductors 5 adapted to produce heat in the interior of the die cavity either through electrical induction or resistance methods. The die cavity 3 is surrounded by an insulating housing 6 which has an opening 7 therein for the passage of a plunger 8. The plunger 8 has a central recess 9 adapted to accommodate the central projection 10 from the die cavity 3.

After the steel ring 1 is placed in the die cavity 3, a quantity of metallic powdered material 11 is then added to the die cavity, filling it to the top and being levelled off so that a predetermined measured quantity of such powdered material is added at each operation. The metallic powdered mixture 11 may consist of finely divided copper powder mixed with such inert material as powdered silica, magnesia, talc, graphite and silicon carbide. The precise proportions of the constituent of the powdered mixture 11, as well as the constituents themselves will be dependent upon the nature of the use to which the resultant article is to be applied. The basic and major constituent of such powdered mixture will of course be a non-ferrous metal.

During the deposition of the steel ring 1 and the metallic powdered mixture 11 in the die cavity 3, the latter is maintained at a working temperature range sufficient to produce a sintering of the mixture 11 and a bonding with the steel ring 1 as the pressure is applied to the mixture by the plunger 8.

During the application of the pressure to the heated mixture, the initially loose metallic particles are ground against each other thereby presenting clean surfaces of contact which, by virtue of the application of the sintering heat, function as germination points for grain growth, thus producing an improved grain structure in the sintered material 2, with coincident improvement in its strength and density.

After the powdered mixture 11 has been pressed, sintered and bonded to the steel ring 1, the plunger 8 is raised from its position of Fig. 4 and the finished composite metallic element, as separately illustrated in Fig. 5 is removed from the die cavity 3.

The complete time cycle for filling the die cavity with the steel ring 1 and the powdered mixture 11, and for compressing, sintering and bonding the material is around 15 seconds. Thus, our method is capable of relatively rapid operation. The temperature range for the heating applied to the materials, by way of example, may be between 1450° and 1950° F. in the case of a copper base powdered mixture. Relatively low pressures for compressing the powdered material, as compared to those previously employed in the manufacture of sintered metallic powder, are also made possible by my method. Satisfactory results can be obtained by using pressures in the range of 500 to 2000 pounds per square inch. Opportunity for oxidation of the particles of the metallic powdered material, tending to render the sintered material brittle and to prevent satisfactory bonding, is substantially eliminated by my process wherein the powdered material is charged into a "hot mold" and rapidly brought to sintering and bonding temperature.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of making composite metallic elements, the steps of providing a steel supporting element, copper plating the surface of said steel element, compressing in the range of 500 to 2000 pounds per square inch, forming and heating to a temperature of 1450° to 1950° F. a copper base powdered material while in contact with the surface of said steel element, thereby integrating and bonding the powdered material to said steel element, said compressing, forming and heating steps being performed simultaneously.

2. In a method of making composite metallic elements, the steps of providing a steel supporting element, copper plating the surface of said steel element, compressing in the range of 500 to 2000 pounds per square inch, forming and heating to a temperature of 1450° to 1950° F. a powdered metal while in contact with the surface of said steel element, thereby integrating and bonding the powdered metal to said steel element, said compressing, forming and heating steps being performed simultaneously.

CARL E. SWARTZ.